United States Patent [19]
Diloia

[11] 4,413,035
[45] Nov. 1, 1983

[54] FRAMING ASSEMBLY

[76] Inventor: Albert A. Diloia, 2594 Carrell La., Willow Grove, Pa. 19090

[21] Appl. No.: 324,641

[22] Filed: Nov. 25, 1981

[51] Int. Cl.³ .......................... G09F 1/12; A47G 1/08
[52] U.S. Cl. ................................. 428/397; 428/542.8;
  40/152; 33/464; 83/745; 403/231; 403/401;
  403/402
[58] Field of Search ....................... 403/231, 402, 401;
  83/745; 40/155, 156, 152, 152.1; 33/482, 464;
  428/57–61, 397, 542.8

[56] References Cited
U.S. PATENT DOCUMENTS 3,205,599  9/1965  Spertus ........................... 403/401 X
3,486,232 12/1969  Klauberg ......................... 33/464 X
4,205,470  6/1980  Kapnek ........................... 403/402 X Primary Examiner—Alexander S. Thomas

[57] ABSTRACT

This disclosure relates to a framing assembly comprising a plurality of elongated members each of which is mitered on at least one end, the at least one mitered end of each elongated member being further provided with a tabular projection of substantially uniform crows section which projects essentially perpendicular to the longitudinal axis of the elongated member, a grooved portion extends substantially the entire length of each of the elongated members and has a cross sectional dimension conforming substantially to the cross sectional dimension of the tubular projection of the elongated member, the tabular projection of one such elongated member being inserted into the grooved portion of an adjacent elongated member to thereby define a rigid frame. A mitering guide is provided which is movably mounted within the grooved portion of the elongated member and which is readily positioned substantially anywhere along the elongated member to facilitate the cutting of the elongated member to any desired length.

1 Claim, 6 Drawing Figures

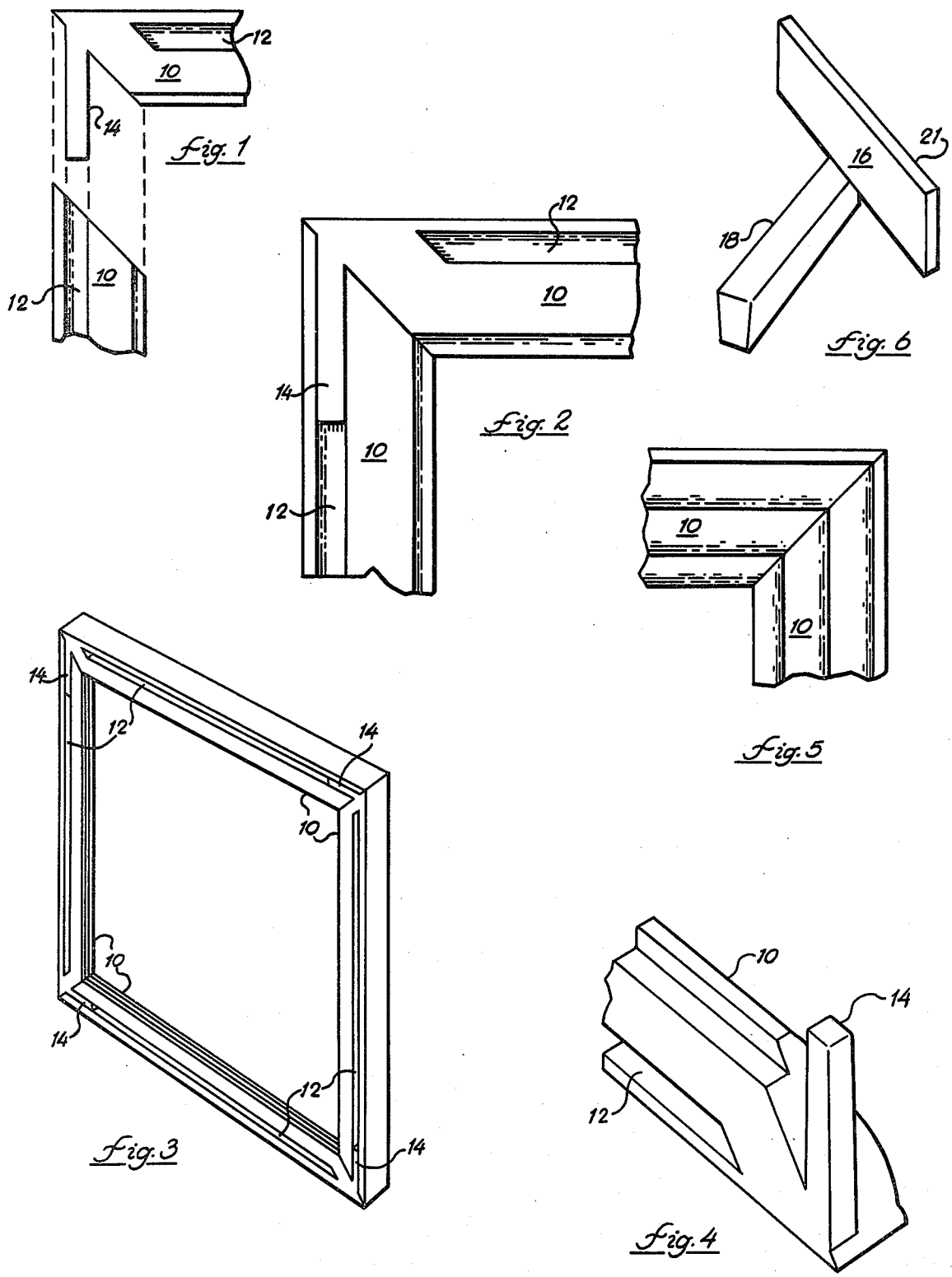

FRAMING ASSEMBLY

BACKGROUND OF THE INVENTION

Frames, whether of the type commonly referred to as "picture frames" or those designed for more utilitarian purposes such as are used in silk screen printing processes or in the fabrication of racks or jigs, have historically been fabricated from lengths of wood which have been mitered at both ends and joined together by diverse means ranging from common nails to specially designed end pieces joined to each of the lengths of wood comprising the elongated side members by various agents including glue depending upon the particular use to which the frame is intended and the rigidity of its structure. While frames comprising wood side members may serve adequately for most purposes, in recent years a trend toward the use of plastic as a substitute for wood including plastic "picture frames" has been noticeably advanced. An example of such a plastic framing assembly is disclosed in U.S. Pat. No. 4,023,293; however, by reason of the multiplicity of components which go to define the aforementioned framing assembly, there is an inherent weakness in its structure related particularly to the manner in which adjacent ones of the elongated framing members are joined together. Thus, not only is the minimum number of components needed to define a frame increased by at least a multiplier of two, but the number of bonding points is likewise multiplied by a minimum factor of two. This in turn gives rise to a higher probability of failure at any one of the bonding points which in and of itself may be sufficient to weaken the framing assembly so as to obviate its intended function. Not only do the increased number of components give rise to an increased cost factor, but the construction cost is further increased by reason of the added labor cost required to effect fabrication of such frames.

In addition to the lack of rigidity in the finished framing assembly, which could only be partially eliminated by enhancing the design of the connecting means, such prior art frames suffer from an added disadvantage in that they are not capable of being readily redimensioned to provide a frame of any desired size.

SUMMARY OF THE INVENTION

In the framing assembly which defines the present invention the components are reduced to a minimum number by fabricating the respective members of plastic material and providing each such member with a unique design such that it can be conveniently cut to any length. The respective component of a framing assembly, having been so cut to their desired dimension, can be interconnected to provide a rigid frame assembly. The result is a simplified frame absent from which are all superfluous and unnecessary connecting parts.

By observing the above outlined criteria, it has been found that a frame may be conveniently constructed, the number of independent components of which are minimized while the resultant structure reflects optimum rigidity and durability.

To achieve the above outlined objectives, a framing assembly was devised which makes use of but one common asymmetrical, elongated, framing member, a plurality of which are conveniently interconnected to form a rigid frame assembly. The asymmetrical design of the framing member is readily apparent in that at one end of the elongated framing member there is a tabular projection of relatively uniform cross section which extends essentially perpendicular to the longitiudinal axis of the framing member and projects from a mitered face thereof. At the other end of the longitudinal member there commences a grooved portion, the cross sectional dimensions of which are substantially identical to those of the tabular projection. The grooved portion extends substantially the entire length of the longitudinal member running parallel to the longitudinal axis thereof. Four such framing members are combined by relatedly positioning the projecting portion of one such elongated member adjacent to the grooved portion of another elongated member, whereby a complete frame can be readily assembled.

The advantages of the present invention will be apparent from the following description when considered in conjunction with the following detailed drawings, which drawings form a part of the specification.

BRIEF DESCRIPTION OF THE DRAWINGS

FIG. 1 comprises a partial rear view showing the tabular projection from one end of an elongated member juxtaposed with respect to the grooved portion of an adjacent elongated member.

FIG. 2 is a partial rear view showing the framing members of FIG. 1 in operative relationship with respect to each other.

FIG. 3 is a rear elevational view of a picture frame according to the invention in an assembled and operable condition.

FIG. 4 is a partial perspective view of one of the framing members showing the mitered end portion and the tabular portion projecting from the face thereof.

FIG. 5 is a partial front elevational view of two of the framing members comprising the subject invention in an assembled and operable condition.

FIG. 6 is a perspective view of a mitering guide to be used in cutting a framing member to desired length.

DESCRIPTION OF THE INVENTION

Referring now to FIGS. 1 through 5, therein is illustrated the preferred embodiment of the common asymmetrical framing member which is generally designated 10. The asymmetrical nature of the framing member 10 is to be seen in FIGS. 1 and 2 in that a grooved portion 12 extends substantially the entire length of the elongated framing member 10 commencing at one end thereof but terminating short of the other end. The end of the framing member 10 opposite that at which the grooved portion 12 commences is mitered at 45 degrees. From the face of the mitered end portion extends a tabular projection 14 of substantially uniform cross section as may be seen in FIG. 4. As may also be noted from FIG. 4, the cross sectional dimensions of the grooved portion 12 are substantially the same as those of the tabular projection 14. Since the framing member 10 is preferably formed by injection molding techniques, there is no difficulty in assuring the cross sectional dimensionality of the tabular projection 14 and the grooved portion 12.

As will be seen upon referral to FIGS. 1 and 2, two framing members 10 are joined together by inserting the tabular projection of one such framing member into the cooperatively positioned grooved portion of an adjacent framing member after the latter has been cut to a desired length by mitering the free end portion thereof. The close dimensional tolerances between the tabular projection 14 of one such framing member and the grooved portion 12 of an adjacent framing member assures the rigidity of the resultant framing assembly. Once all members have been cut and assembled, a prescribed quantity of solvent may be interjected at the points on the framing assembly where the tabular projection 14 is inserted into the grooved portion 12 so as to permanently bond the respective components of the framing assembly together.

A complete framing assembly is depicted in FIG. 3 wherein each of the framing members 10 are depicted as being of equal length; however, more generally, the respective framing members 10 will be paired to provide a resultant rectangular framing assembly. As indicated above, each of the framing members 10 may be conveniently cut to a desired length by mitering the free end portion thereof (i.e., the end of the framing member at which the grooved portion 12 commences). To further assist in the fabrication of the framing assembly by ensuring that the framing members are cut to the desired length and at the appropriate mitered angle, a mitering guide, depicted as member 16 of FIG. 6, is provided. The mitering guide 16 is an accessory to the preferred embodiment of the subject invention and while depicted here in its most rudimentary form may be of different design without departing from its intended function. The mitering guide 16 is provided with a tabular projection 18 of similar dimension to the tabular projection 14 of FIG. 1, which tabular projection is oriented at an angle with respect to the guide portion 21 of the cutting guide such that when the tabular projection is positioned within the grooved portion 12 of a framing member 10 it may be readily repositioned such that a saw blade, not shown, may be precisely positioned to cut the framing member 10 to a desired length.

As will be readily apparent on reference to FIGS. 3 and 5, once the respective pairs of framing members 10 have been cut to their desired length and the tabular projection 14 of one such member inserted into the corresponding grooved portion 12 of an adjacent member, there results a framing assembly whose rigidity may be enhanced by permanently bonding the tabular projection 14 with respect to a corresponding grooved portion 12 by introducing a prescribed amount of solvent or other conventional bonding agent. The framing assembly depicted in FIGS. 3 and 5 is adapted to serve as a conventional picture frame; the front face of the framing members 10 as depicted in FIG. 5 are decoratively configured and may further be given the appearance of wood by introducing a graining effect into the mold, not shown, by means of which the framing members are injection molded. The appearance of natural wood framing members is further enhanced by the astute selection of color additives to the plastic materials prior to the injection molding step.

While not deemed pertinent to an understanding of the present invention, reference is now made to the procedure followed in fabricating the framing members 10. In this respect, a single-cavity mold was placed in a Stokes Model 300-H-25 press to which the plastic materials comprising the combination of conventional HI P/S pellets and powdered Celogen AZNP-130 was added in the ratio of 50 pounds of HI P/S to 341 grams of Celogen AZNP-130, the combination of which was supplemented by a wetting agent comprising 30 grams of Silogram Wetlube. The molding materials were introduced into the mold via a conventional MIS Model 20 shut-off nozzle. The nozzle and mold temperatures were in a range of 375 degree Fahrenheit to 500 degree Fahrenheit with an even temperature gradient running from the nozzle to the rear zone of the mold. The composition was molded under pressures of 15,000 to 16,000 PSI. Molding time ranged from 0.8 seconds introduction to 3.0 seconds per curing step. During the molding process, both halves of the mold were water cooled with a reduction in water flow during the injection step to assist in material flow as required. The finished part weight of representative samples was 95.6 grams per framing member.

Although the specification defines a framing assembly of particular design, it will be appreciated that the invention is not limited thereto. Accordingly, any modifications, variations, or equivalent arrangement of framing members resulting in a framing assembly of different configuration, e.g., circular, triangular, or oval, may still be within the scope of the appended claims and should be considered as part of the invention. Having thus described in detail our invention,

We claim:

1. A framing kit comprising the combination of four molded elongated plastic members each of which is mitered on at least one end(,) and having a tabular member of essentially rectangular cross section oriented perpendicularly with respect to the longitudinal axis of each said elongated member and projecting from the mitered end thereof, all four sides of said tabular member being of substantially equal dimension, a groove of essentially the same cross sectional dimensions as said tabular member and extending substantially the entire length of said elongated member, and a mitering guide for assisting in the cutting of each of said elongated members to a desired length and for providing each such member with a mitered surface which angularly relates to a cooperating one of said longitudinal members, said mitering guide comprising a tabular projection of substantially the same dimensions as those of the tabular projection of said elongated member, said mitering guide further comprising a guide portion attached to said tabular projection and angularly oriented with respect to said tabular projection such that when said tabular projection is positioned within the groove of one of said elongated members said mitering guide may be readily shifted to any desired position along said elongated member thereby enabling said elongated member to be cut to any desired length at a mitered angle which cooperatively relates to the mitered end of said longitudinal members, whereby said four longitudinal members after being cut to their desired length are joined together by inserting the tabular projection of one such longitudinal member into the groove of an adjacent longitudinal member to complete the fabrication of a frame of desired dimension.

* * * * *